Sept. 1, 1931.  L. MARX  1,820,944
COMBINED LOADING CART AND SIFTER SCREEN
Filed Nov. 29, 1927
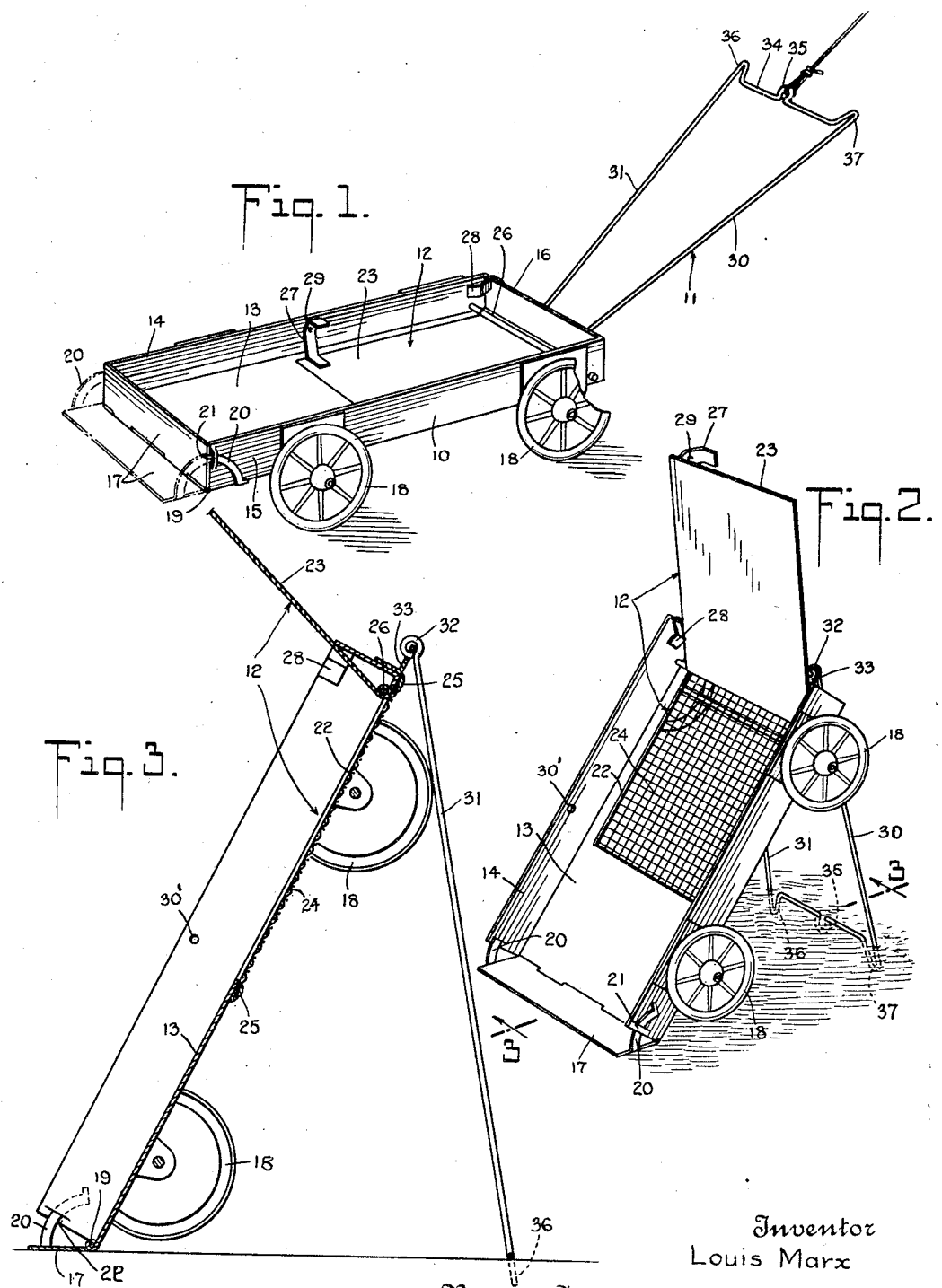
Inventor
Louis Marx
By Cavanagh & James
Attorney Patented Sept. 1, 1931

1,820,944

UNITED STATES PATENT OFFICE

LOUIS MARX, OF BROOKLYN, NEW YORK

COMBINED LOADING CART AND SIFTER SCREEN

Application filed November 29, 1927. Serial No. 236,462.

This invention relates to a combined loading receptacle and sifter screen structure, and relates more particularly to a loading receptacle or cart convertible into an apparatus for shifting the contents or load of the cart.

One of the principle objects of my present invention centers about the provision of a combined loading receptacle or cart and sifter screen structure designed and constructed so as to serve as a means for transporting a load of sand or other material from place to place and as a means for screening or sifting such load of sand or other material. In one of its preferred forms, as exemplified in this application, the structure is designed as a toy adapted particularly for playful use in the play-yard and at beaches, the cart or receptacle serving its intended use for receiving, holding and conveying a sand load, and the same being readily convertible by the child into a screening or sifting apparatus for the conveyed load.

Other and ancillary objects of the invention include the provision of a combined loading cart and sifter screen structure in which the draft device for the cart also serves as a means for supporting the structure in an inclined sifting position when the same is converted from a cart use to a sifter use; the still further provision of a combined cart and sifting apparatus in which a part of the structure movable to convert the same from a loading cart to a sifting apparatus functions as a deflector for deflecting the sand onto the screening apparatus; and the still further provision of a combined cart and sifting screen having a simple organization of parts such that the same may be readily manufactured at a low cost and may be handled by a child as a toy with playful ease.

To the accomplishment of the foregoing and such other objects as will hereinafter appear, my invention consists in the elements and their relation one to the other, as hereinafter more particularly described and sought to be defined in the claims, reference being had to the accompanying drawings which show the preferred embodiment of my invention, and in which Fig. 1 is a perspective view showing the combined cart and sifter screen structure in use as a loading cart, Fig. 2 is a perspective view showing the same in use as a sifter screen, and Fig. 3 is a view thereof taken on an enlarged scale in cross section in the plane of the line 3—3, Fig. 2.

Referring now more in detail to the drawings, I show my invention applied in the form of a toy cart and screen structure comprising a wheeled truck or body 10 having a draft or pull device 11 and provided with means generally designated as 12 for converting the cart from a loading receptacle into a sifter screen.

The truck body 10 having a bottom or floor 13 and preferably enclosing walls including the side walls 14 and 15, the front wall 16 and the rear wall 17 is provided with front and rear wheels collectively designated as 18 embodying a design or construction of any approved form. The rear wall 17 is preferably movably mounted on the truck body and may be hinged thereto as shown at 19 so as to be movable from the closed position shown in full lines in Fig. 1 to the open position shown in Figs. 2 and 3, the said rear wall 17 being preferably provided with guide and stop means in the form of arcuate arms 20 which may be formed integrally with the rear wall 17 guided in the ear portion 21 struck out from each side wall of the cart body, these parts cooperating to form stop or limiting means.

The cart and sifter screen converting means 12 comprises in one of its simplest forms the provision of an opening 22 in the bottom or floor 18 of the receptacle or cart body, a closure 23 for said opening and a screen 24 for said opening, the closure 23 being movable from its closed position shown in Fig. 1 to its open position shown in Figs. 2 and 3. The screen 24 underlies the closure 23 and is preferably permanently affixed to the underneath surface of the cart floor or bottom 13 as by means of brazing the peripheral edges of the screen to the underneath surface of the bottom 13 as shown at 25. Manifestly, the screen may be removable and may be made interchangeable with the closure 23. It is preferred, however, to permanently affix this screen for greater convenience of use and operation. The closure 23 is preferably hingedly mounted at the front or forepart of the cart as at 26 so that when the closure 23 is moved to its open position it serves as a deflector for the sand or other material which is thrown onto the screen structure, as will be clearly apparent from a consideration of Figs. 2 and 3 of the drawings.

Preferably means is provided for latching the closure in both its closed and open positions and the same may be made to comprise a latched element 27 for locking the closure in its closed position, and a second latch element 28 for holding the closure in its open position. The latch element 27 in the form of a U-shaped member affixed at its bottom to the closure 23 is preferably shaped so as to define a finger or hand grasp to permit ready opening of the closure, it being understood that the closure 23 when in its closed position is preferably made to lie flush with the cart floor or bottom 13. This latch element 27 is preferably provided with a struck up teat 29 which snaps into a recess 30 in the cart side wall 14, mating therewith for latching purposes. The second latch element 28 is affixed frontally to one of the side walls such as 14 of the cart and is provided with a free resilient portion engaged by an edge of the closure 23 in the manner clearly indicated in Figs. 2 and 3 of the drawings for holding the closure in its open position.

When the cart or truck body is converted into a sifter screen apparatus it is desired to support the converted apparatus in an inclined sifting position; and this I preferably accomplish by designing the draft or pull device 11 so as to serve the double function of a draft device and a support for the screen structure. This will be readily seen by comparing Fig. 1 with Figs. 2 and 3 of the drawings wherein the draft device 11 is shown movable from its pull or draft condition (Fig. 1) to a position for supporting the screen structure in its inclined sifting condition. The draft device 11 is preferably made U or yoke-shaped having side arms 30 and 31 provided with preferably loop ends 32 engaged in any suitable part such as 33 of the cart body, providing a pivot or hinge for the draft device, the said arms 30 and 31 being connected together by a transverse portion 34 which is preferably provided centrally with a cord engaging loop element 35 and terminally with elements 36 and 37 which are intended to serve as supporting legs capable of being imbedded in said or soft earth to form a stable support for the screen structure, as is clearly shown in Figs. 2 and 3 of the drawings.

The manner of making and using the combined cart and sifter screen apparatus of my present invention will, in the main, be fully apparent from the above detailed description thereof. Fig. 1 of the drawings clearly depicts the use of the apparatus as a cart adapted to receive, hold and transport a load from place to place, and Figs. 2 and 3 of the drawings depict the manner in which the said cart may be quickly changed into a sifting apparatus, the draft 11 being movable into sifting supporting position and the closure 23 being movable to an open and screen exposing position, the said closure 23 in open position serving as a means for catching any sand thrown onto the screen and for deflecting the same to the screen section of the apparatus.

It will also be apparent that while I have shown and described by invention in the preferred form, many changes and modifications may be made in the structure disclosed without departing from the spirit of the invention, defined in the following claims.

I claim:

1. A combined loading cart and sifter screen structure comprising a cart or truck body adapted for receiving and holding a load, the said truck body having a floor provided with an opening, a closure for said opening substantially flush with said floor and a sifter screen for said opening, said sifter screen being located below said closure, said closure being movable from a closed position resting on the sifter screen to an open position for converting the structure from a loading cart to a sifter screen.

2. A combined loading receptacle and sifter screen structure comprising a receptacle body adapted for receiving and holding a load, the said body having a floor provided with an opening, a closure for said opening, a sifter screen for said opening, said closure being movable from a closed position to an open position for converting the structure from a loading receptacle to a sifter screen, and a support for holding said receptacle body in a relatively upright sifting position.

3. A combined loading cart and sifter screen structure comprising a cart or truck body adapted for receiving and holding a load, the said truck body having a floor provided with an opening, a closure for said opening movably mounted on said truck body adjacent one end thereof, and a sifter screen for said opening, said closure being movable from a closed position to an open position for converting the structure from a loading cart to a sifter screen, the closure in its open position defining a deflector for deflecting material onto said sifter screen.

4. A combined loading receptacle and sifter screen structure comprising a receptacle body adapted for receiving and holding a load, the said body having a floor provided with an opening, a closure for said opening movably mounted on said receptacle body adjacent one end thereof, and a sifter screen for said opening, said closure being movable from a closed position to an open position for converting the structure from a loading receptacle to a sifter screen, the closure in its open position defining a deflector for guiding material onto said screen, and a support for holding said receptacle body in an inclined sifting position.

5. A combined loading receptacle and sifter screen structure comprising a receptacle body adapted for receiving and holding a load, the said body having a floor provided with an opening, a closure for said opening pivotally mounted adjacent an end of said body, and a sifter screen for said opening, said closure being movable from a closed position to an open position for converting the structure from a loading receptacle to a sifter screen, and latch elements for holding said closure in its open and closed positions, one of the latch elements also defining a finger grasp for the closure.

6. A combined cart and sifter screen structure comprising a cart or truck body, the said truck body having a floor provided with an opening, a sifter screen for said opening, a closure for covering said screen and a draft device for said truck body, the said draft device being movable from its draft or pull position to a position for defining a support for supporting the cart and sifter in an inclined sifting position.

7. A combined loading cart and sifter screen structure comprising a wheeled cart or truck body adapted for receiving and holding a load, the said truck body having a floor provided with an opening, a closure for said opening and a sifter screen for said opening, said closure being movable from a closed position to an open position for converting the structure from a loading cart to a sifter screen, the closure in its open position defining a deflector for deflecting material onto said sifter screen.

8. A combined loading cart and sifter screen structure comprising a cart or truck body adapted for receiving and holding a load, the said truck body having a floor provided with an opening, a closure for said opening, a sifter screen for said opening, said closure being movable from a closed position to an open position for converting the structure from a loading cart to a sifter screen, and a draft device for said truck body, the said draft device being movable from its draft or pull position to a position for defining a support for supporting the cart and sifter in an inclined sifting position.

9. A combined loading cart and sifter screen structure comprising a cart or truck body adapted for receiving and holding a load, the said truck body having a floor provided with an opening, a closure for said opening hingedly mounted adjacent the front of said truck body, a sifter screen for said opening and a draft device hingedly mounted at the front of said truck body, the said closure being movable from a closed position to an open position for converting the structure from a loading cart to a sifter screen, the closure in its open position defining a deflector, and the said draft device being movable from its draft or pull position to a position defining a support for supporting the cart and sifter in inclined sifting position.

10. A combined loading cart and sifter screen structure comprising a wheeled cart or truck body open at its top and adapted for receiving and holding a load, the said truck body having a floor and enclosing side, front and rear walls, the said floor being provided with an opening and the said rear wall being hinged to the truck body, a closure for said opening and a sifter screen for said opening, said closure being movable from a closed position to an open position for converting the structure from a loading cart to a sifter screen.

11. A combined loading cart and sifter screen structure comprising an open wheeled cart or truck body adapted for receiving and holding a load, the said body being provided with side and bottom but no top walls, one of said walls having a sifting screen and a movable closure above the screen for converting the structure from a loading receptacle to an open sifter screen, and means for supporting the complete cart and sifter screen structure in an inclined sifting position when it is to be used as a sifting screen.

Signed at New York city, in the county of New York and State of New York, this 16th day of November, A. D. 1927.

LOUIS MARX.